April 17, 1951  J. S. IDELMAN  2,549,202
CUTTING MACHINE
Filed July 12, 1946  5 Sheets-Sheet 1

INVENTOR.
JEROME S. IDELMAN
BY Joshua R H Potts
HIS ATTORNEY

April 17, 1951　　　　　J. S. IDELMAN　　　　　2,549,202
CUTTING MACHINE
Filed July 12, 1946　　　　　　　　　　　　　　5 Sheets-Sheet 2

INVENTOR.
JEROME S. IDELMAN
BY
HIS ATTORNEY

April 17, 1951 J. S. IDELMAN 2,549,202
CUTTING MACHINE
Filed July 12, 1946 5 Sheets-Sheet 4
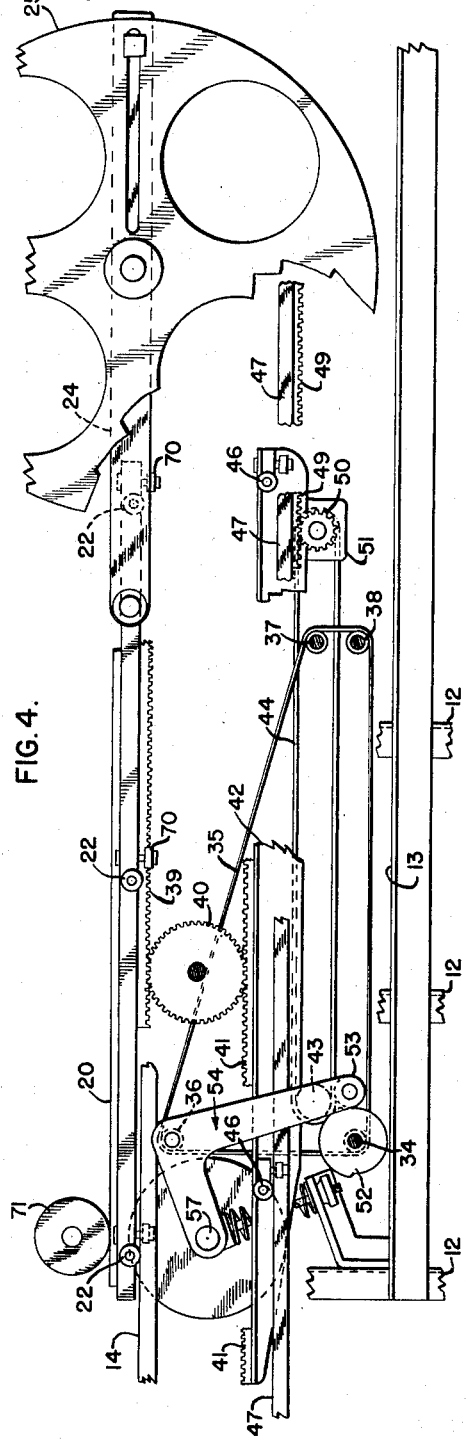
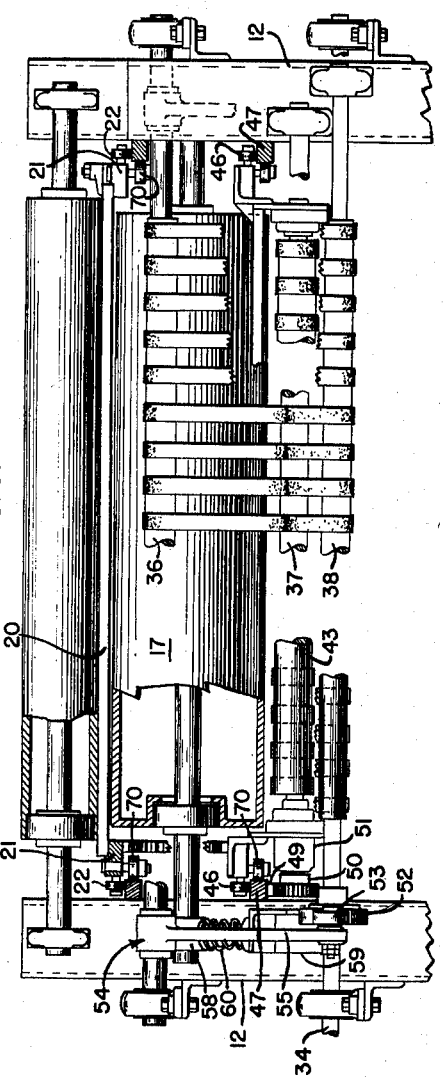
FIG. 4.
FIG. 5.
INVENTOR.
JEROME S. IDELMAN
BY Joshua R H Potts
HIS ATTORNEY Patented Apr. 17, 1951

2,549,202

UNITED STATES PATENT OFFICE 2,549,202

CUTTING MACHINE

Jerome S. Idelman, Chicago, Ill.

Application July 12, 1946, Serial No. 683,252

12 Claims. (Cl. 164—20)

This invention relates to cloth-cutting means. More particularly, it relates to cutting pieces of cloth and piling them, etc.

The cloth may be cut in various designs. For example, it may be cut in the form of a part of a coat, with a hole punched out for the attachment of the sleeve.

A skirt or the major portion thereof may be punched out with a single operation.

Various other garments or items, or portions thereof, may be cut in a single cutting operation.

The advantages will be at once apparent. Garments will be cut faster than ever before.

According to the principle of my invention, I have provided a means for drawing cloth beneath a cutter, to cut a desired piece or pieces of cloth. The cloth may be drawn from a roll or rolls, or stacked piles or other source.

The piece or pieces of cloth are then carried by a belt or conveyor, and are dropped upon another belt or conveyor, from which they are dropped on a pile.

The operations are all dovetailed. Another piece or pieces of cloth are cut by the time the first piece or pieces are carried to the end of the first conveyor, and the second conveyor has returned to a point where it is ready to pick up another piece or pieces of cloth, and repeat the rest of the operation.

Only those who are skilled in this line of business can appreciate the advance made by the present invention in cutting out garments or pieces of garments at a single operation or a single series of operations.

Another feature of my invention is the provision of table-moving means, for use in connection with the pieces of goods which are cut and dropped to form a pile on the table.

By means of my invention, I have provided table means whereby the table always moves downwardly substantially the depth of a piece of cloth, so that after a piece has been dropped onto the pile, the table and its pile moves downwardly to accommodate another piece.

In short, the table and its pile are always in the proper place to receive another piece of goods deposited from a belt or conveyor.

Further objects and advantages will appear and be brought out more fully in the following specification, reference being had to the accompanying drawings, in which:

Fig. 4 is an enlarged longitudinal section, showing the mechanism of the machine.

Fig. 5 is an enlarged end section of the machine.

Figure 1:
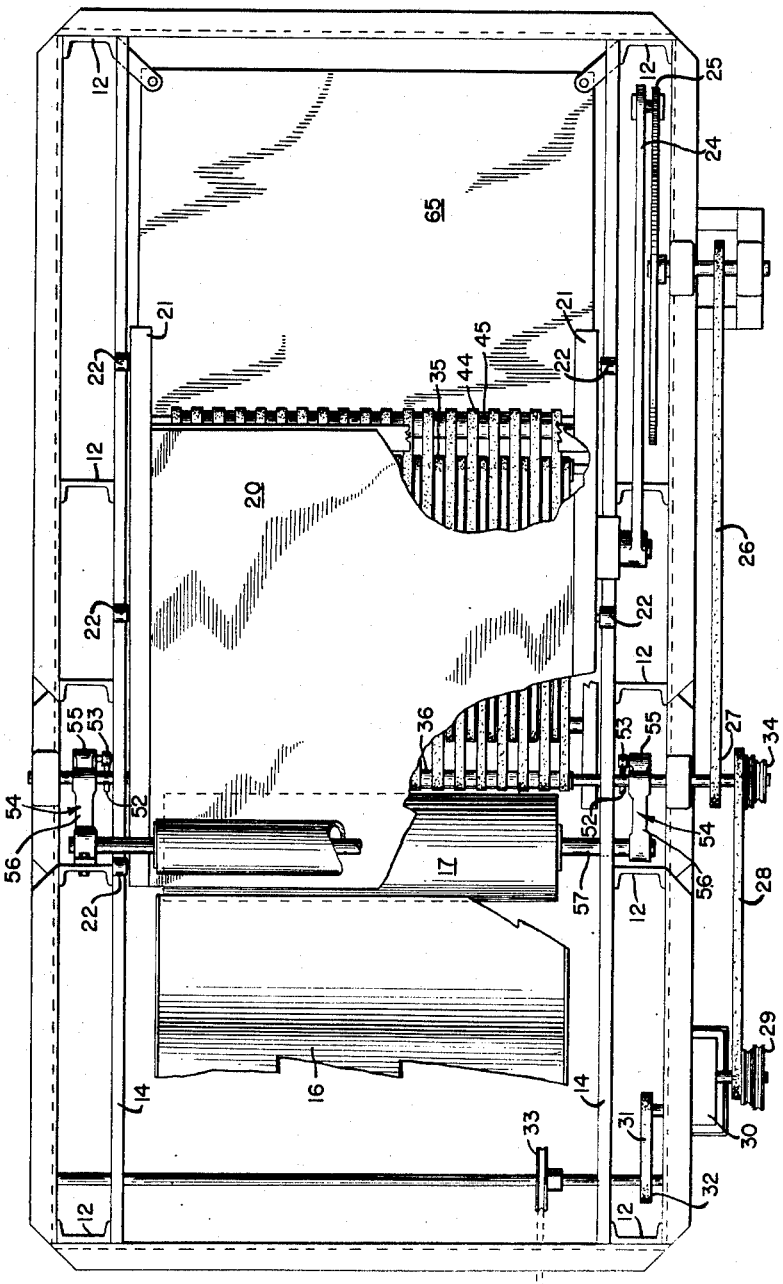
Fig. 1 is a plan view of the machine.
Figure 2:
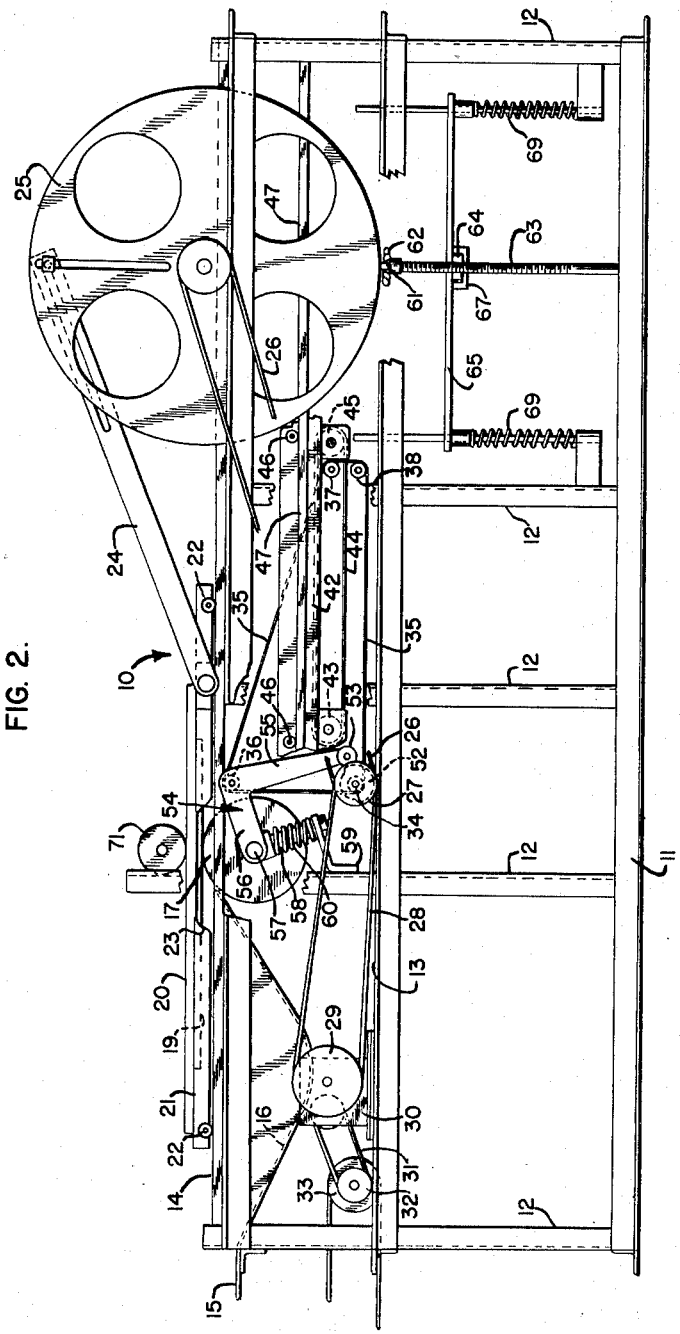
Fig. 2 is a side elevation.

Referring to the drawings in detail, in which I have shown the preferred form for the purpose of illustrating the principle of my invention, I have shown, in Fig. 2, a machine 10, having a base 11 and standards 12, supporting a lower platform 13, and an upper platform 14.

Figure 6:
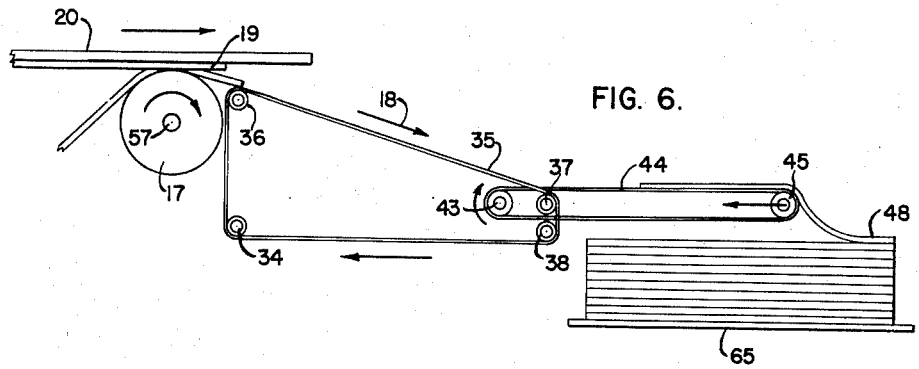
Figs. 6 to 9 show the sequence of operation.

The machine is provided with a guiding ledge 15, over which cloth from a roll, not shown, is adapted to be led to a well 16 and over a roller 17, the cloth being drawn in the direction of the arrow 18 in Fig. 6, by means of contact between the roller 17 and the knife 19.

The knife 19 may be secured to the support 20 by any suitable means such as riveting.

Secured to the support 20, is a roller support 21, in which is mounted rollers 22.

The roller supports 21 are cut away, as at 23, as shown in Fig. 2, for a purpose which will be more evident hereinafter.

Also pivotally secured to the roller support, is a connecting rod 24, which is also connected to a flywheel 25.

This flywheel is adapted to reciprocate the cutter just described.

The flywheel is driven itself by a belt 26, from a pulley 27, which is itself driven by a belt 28 from a pulley 29.

Pulley 29 is connected to a reducing gear 30, and a belt 31 is led from reduction gear to a pulley 32, to another pulley 33 leading to a source of power.

The pulley 27 is mounted on a shaft 34, and drives a belt 35 around a pulley 36 and pulleys 37 and 38, as will be apparent from Fig. 2.

Also secured to the cutter support 20 is a rack 39, which is adapted to mesh with a gear 40, which, in turn, meshes with a second rack 41.

This rack 41 is mounted on an intermediate platform 42 in any suitable manner.

The platform 42 has mounted thereon a pulley 43, a belt 44 and a second pulley 45, as shown in Figs. 2 and 4.

The platform 42 is provided with rollers 46, which are adapted to roll on trackway 47, mounted on the framework, as shown in Fig. 2.

As will be more fully apparent hereinafter, the rack 41 is adapted to reciprocate the belt 44 and the pulleys 43 and 45.

Reviewing what has been described thus far, the cloth is brought from a roll over the guiding ledge. Then it is brought over the roller and is cut.

The blank is then dropped on the belt 35 from whence it is dropped onto the belt 44.

It will be understood that the belts 35 and 44 are not necessarily just one belt, but may be, and in the drawings represent, a series of narrow belts which are interlaced with each other.

The belt 44 is adapted to deposit the cloth in a pile 48.

Figure 7:
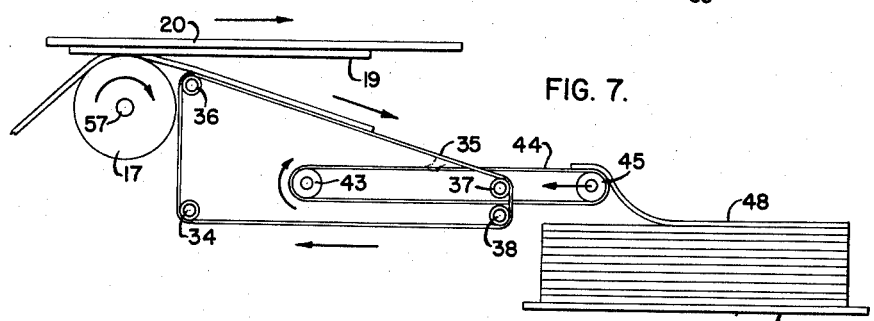

In the machine of my invention, the belt 44 rotates only on the travel to the left, as shown in the drawings in Figs. 6 and 7, and the purpose of this is that it is desired to take the cloth away from the belt 35, as shown specially in Figs. 6 and 7.

Figure 8:
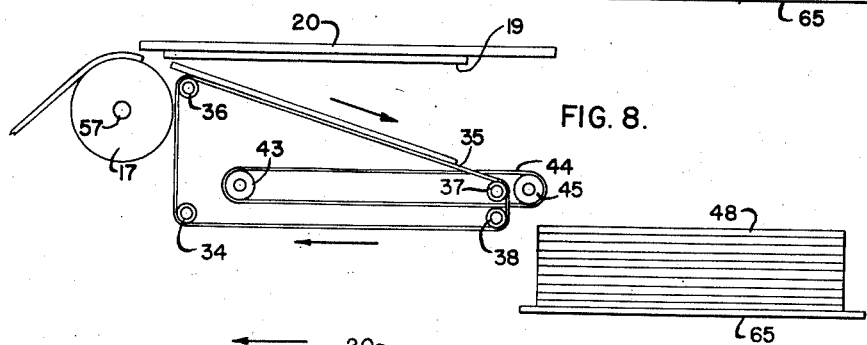
Figure 9:
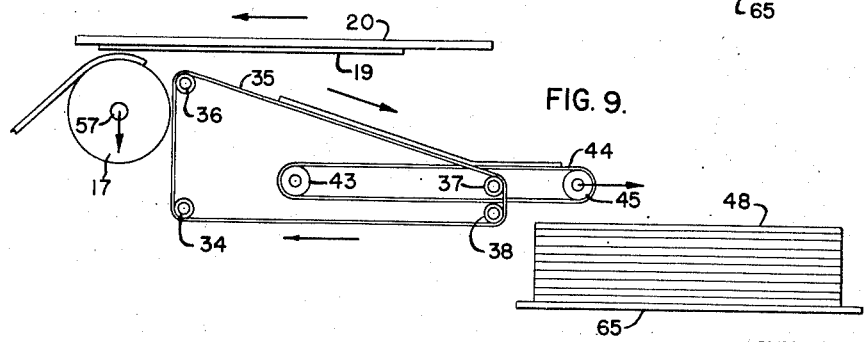

As shown in Figs. 8 and 9, there is no need for the belt 44 to rotate in either direction when it moves to the right as it carries a cut piece of cloth, and so the belt does not rotate when the belt reaches the left-most travel, looking at Fig. 8, and does not travel over the rollers 43 and 45 until the belt 44 reaches the limit of its travel to the right, when there begins to be need of it.

This operation is accomplished in this manner: Another rack 49 is secured to the frame, and is adapted to mesh with a gear 50.

When the platform 42 moves to the right, looking at Fig. 4, the rack 49 will rotate the gear 50, and thereby rotate the pulley 45. However, when the belt 44 is travelling to the right, looking at Figs. 4, 6, 7, 8 and 9, the power is not transmitted to the pulley 45, because the gear 50 is connected to a one-way clutch 51.

The roller 17 is adapted to maintain constant pressure on the cloth against the knife 19, when it is desired to cut and pull the cloth, to-wit: when the cloth is moving forward and through the machine. However, after the cutting operation is finished, it is no longer desired to maintain contact between the roller, the knife and the cloth, since it is desired that the cloth should remain at the point where it has been cut on the roller, so that it is in its proper place when the cutting and pulling operation resumes to cut another blank.

The alternating passage forward of the cloth is made possible by the fact that the roller is alternately dropped down away from the pressure with the cloth and knife and alternately brought up back into pressure with the cloth and the knife.

The shaft 34 is provided with a cam 52, which is adapted to intermittently raise a roller 53 on one end of a bell crank lever 54, having a leg 55 and a leg 56.

The leg 56 is apertured to receive the axle 57 of the roller 17.

Also mounted on the axle 57, is a stud 58, the other end of which stud is secured in a bracket 59.

A coil spring 60 is mounted on the stud.

In the operation, the cam raises the roller 53, which lowers the leg 56, which forces the axle of the roller 17 downwardly and thus the roller itself away from contact with the cloth and the cutter.

When the cutter 19 has reached the extreme right limit of travel, as shown in Fig. 8, the cam or raised portion will have passed by the roller 53, and the arm 56 will be lowered against the tension of the spring 60, and the roller 17 and its axle will also be lowered until the cutter reaches the left limit of its travel, as shown in Figs. 6 to 9.

Then the lower portion of the cam will come in contact with the roller 53, and the roller will move in the direction of the cam, resulting in the arm 56 being raised by the spring, together with the axle 57 and the roller 17.

The result is that the roller 17 is once more in pressure contact with the cloth and the knife or cutter.

Secured to the periphery of the fly wheel 25, is a finger 61, which is adapted to turn a gear 62 at the rate of one tooth per revolution of the flywheel, although equivalent arrangement could be made.

The turning of the gear 62 is adapted to turn a threaded rod 63, which is in mesh with a threaded end 64 of a solenoid extension.

Figure 3:
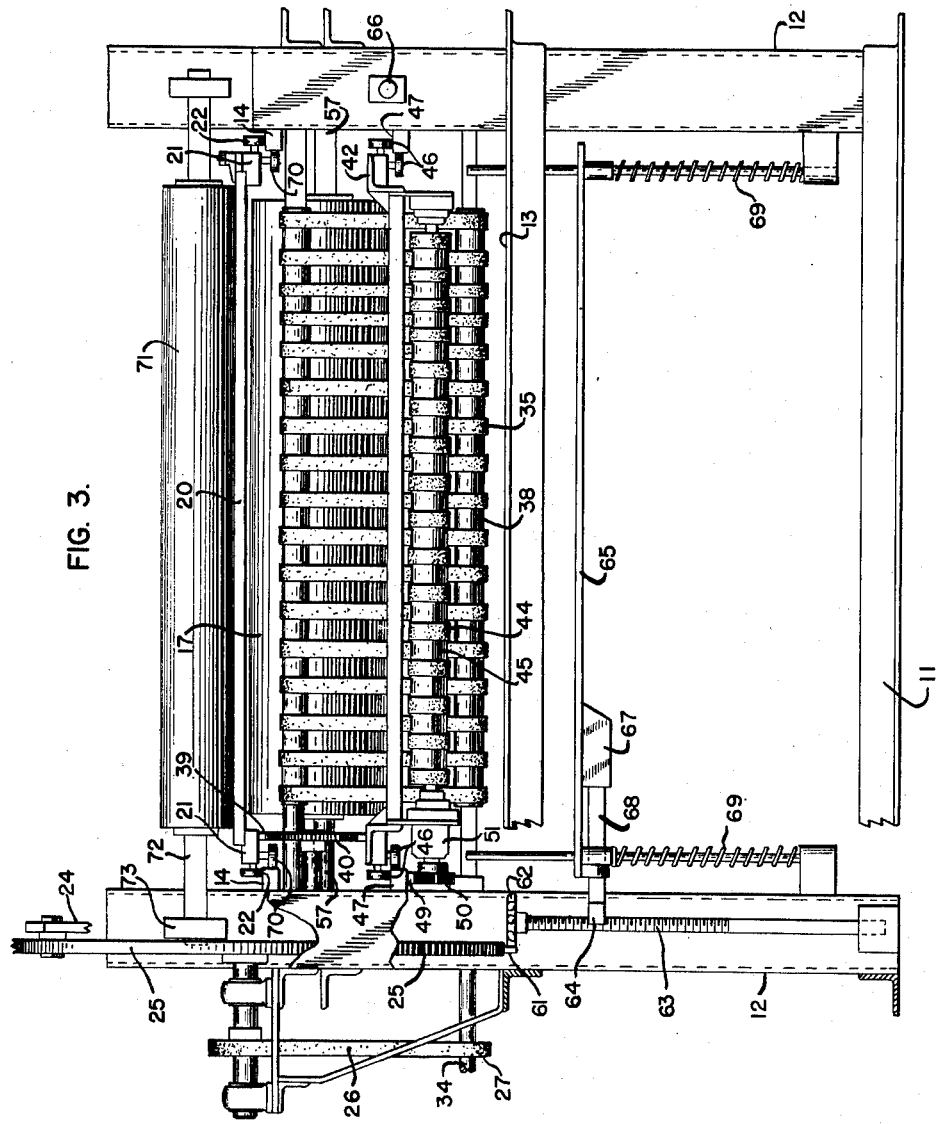
Fig. 3 is an end view.

As the gear 62 revolves and the threaded rod also revolves, the solenoid extension is adapted to be revolved and lowered, and with it the table 65; and so, as the blank cloths are dropped onto the table, as shown in Fig. 6, the table is lowered, as shown in Fig. 3.

After the table is loaded as much as desired, and it is desired to raise the table again, then a switch 66, to operate a solenoid 67, to withdraw the extension 68 from contact with the threaded rod 63 and the spring 69, will return the table to its original height. Instead of the solenoid, other means may be used to withdraw the extension.

The knife may be formed according to the cut desired. For example, if it is desired to cut out one side of a coat, or other garment or item, then there will be a design in the knife to make that cut, as is well understood by those skilled in the art.

Rollers 70 have been provided to control the sidewise motion of the knife support 20 and the intermediate platform 42, as will be readily understood by those skilled in the art.

I have also provided an idle roller 71, to keep the pressure between the cutter and the cloth and the roller 17. This may be mounted on a suitable shaft 72 and bearings 73.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variation and modifications as come within the scope of the appended claims.

Having thus described my invention, what I claim as new and desire to secure by Letters Patent is:

1. In a machine for cutting pieces of a desired shape from a continuous strip of cloth, a knife having a shape corresponding to that of the piece to be cut and including a portion that extends generally longitudinally of the strip and another portion extending transversely thereof, said knife being mounted for reciprocal translational movement longitudinally of said strip, a pressure roller mounted opposite to said knife with the strip of cloth passing between said knife and roller, a movable mounting for said roller providing movement of said roller toward and away from said knife, and mechanism for coordinating the reciprocal translational movement of said knife with movement of said roller.

2. In a machine for cutting pieces of a desired shape from a continuous strip of cloth, a frame, a knife support mounted for reciprocation in said frame in a direction corresponding to the longitudinal extent of said strip, a knife carried by said support and having a shape corresponding to that of a piece to be cut, said knife including a portion extending longitudinally of said strip and a portion extending transversely thereof, a pressure roller movably mounted in said frame opposite to said knife and arranged with the strip of cloth passing between said knife and roller, means for reciprocating said knife support, means for moving said roller toward and away from said knife, and mechanism for coodinating the operations of both of said last named means.

3. In a machine for cutting pieces of a desired shape from a continuous strip of cloth, a frame, a knife support mounted for reciprocation in said frame in a direction corresponding to the longitudinal extent of said strip, a knife carried by said support and having a shape corresponding to that of a piece to be cut, said knife including a portion extending longitudinally of said strip and a portion extending transversely thereof, a pressure roller movably mounted in said frame opposite to said knife with the strip of cloth passing between said roller and said knife, spring means normally biasing said roller against said knife, means for retracting said roller against the influence of said spring means, means for reciprocating said knife support, and mechanism for coordinating reciprocation of said knife support with movement of said roller toward and away from said knife.

4. In a machine for cutting pieces of a desired shape from a continuous strip of cloth, a frame, a knife support mounted for reciprocation in said frame in a direction corresponding to the longitudinal extent of said strip, a knife carried by said support and having a shape corresponding to that of a piece to be cut, said knife including a portion extending longitudinally of said strip and a portion extending transversely thereof, a bell crank having two arms pivotally mounted on said frame beneath said knife, a pressure roller mounted on one arm of said bell crank, spring means associated with said arm carrying the pressure roller normally biasing said pressure roller toward said knife, actuating means operatively associated with the other arm of said bell crank for causing movement thereof to move said roller away from said knife against the influence of said spring means, a flywheel pivotally mounted on said frame, a connecting rod operatively connecting said flywheel to said knife support, a power source, and driving connections between said power source and said flywheel and actuating means, said driving connections being effective to coordinate reciprocation of said knife support with movement of said roller toward and away from said knife.

5. In a machine for cutting pieces of cloth from a continuous strip, a frame, a knife mounted for reciprocal translational movement of said frame in a direction corresponding to the longitudinal extent of said strip, said knife having a shape corresponding to that of the pieces to be cut, a pressure roller movably mounted in said frame opposite to said knife with the strip of cloth passing between said knife and said roller, an endless conveyor including a downwardly inclined upper ply positioned to receive a piece cut from said cloth, means for driving said conveyor as an incident to cutting movement of said knife, a second endless conveyor having an upper ply positioned to receive a piece of cloth from said first conveyor, said second conveyor being mounted for reciprocal translational movement in said frame, a pair of rollers supporting said second conveyor and movable translationally therewith, and mechanism for causing travel of said second conveyor over said rollers upon translational movement of said conveyor and rollers in one direction only.

6. In a machine for cutting pieces of cloth from a continuous strip, a frame, a knife mounted for reciprocal translational movement in said frame in a direction corresponding to the longitudinal extent of said strip, said knife having a shape corresponding to that of the pieces to be cut, a pressure roller movably mounted in said frame opposite to said knife with the strip of cloth passing between said knife and said roller, an endless conveyor comprising a plurality of belts which are spaced apart and which together provide a composite upper ply adapted to receive a cut piece, means for driving said conveyor as an incident to cutting movement of said knife, a platform reciprocally mounted in said frame in a position substantially parallel to said knife, operating connections between said platform and said knife whereby movement of said knife causes movement of said platform, a pair of rollers mounted in spaced relation on said platform, a second conveyor carried by said rollers and comprising a plurality of spaced belts that are interposed between the belts of said first conveyor, the belts of said second conveyor providing a composite upper ply that receives pieces from said first conveyor, rack and gear means for causing travel of said second conveyor over said rollers upon movement of said platform in one direction, and means for rendering said rack and gear means ineffective for movement of said platform in the opposite direction.

7. In a machine for cutting pieces of cloth from a continuous strip, a frame, a knife mounted for reciprocal translational movement in said frame in a direction corresponding to the longitudinal extent of said strip, said knife having a shape corresponding to that of the pieces to be cut, a pressure roller movably mounted in said frame opposite to said knife with the strip of cloth passing between said knife and said roller, an endless conveyor comprising a plurality of belts which are spaced apart and which together provide a composite upper ply adapted to receive a cut piece, means for driving said conveyor as an incident to cutting movement of said knife, a platform reciprocally mounted in said frame in a position substantially parallel to said knife, a gear mounted on a fixed axis in said frame, a rack secured to said knife and engaging said gear, a second rack secured to said platform and engaging said gear, said racks and gear being effective to cause movement of said platform as an incident to movement of said knife, a pair of rollers mounted in spaced relation on said platform, a second conveyor carried by said rollers and comprising a plurality of spaced belts that are interposed between the belts of said first conveyor, the belts of said second conveyor providing a composite upper ply that receives pieces from said first conveyor, rack and gear means for causing travel of said second conveyor over said rollers upon movement of said platform in one direction, and means for rendering said rack and gear means ineffective for movement of said platform in the opposite direction.

8. In a machine for cutting pieces of cloth from a continuous strip, a frame, a knife mounted for reciprocal translational movement in said frame in a direction corresponding to the longitudinal extent of said strip, said knife having a shape corresponding to that of the pieces to be cut, a pressure roller movably mounted in said frame opposite to said knife with the strip of cloth passing between said knife and said roller, an endless conveyor including a downwardly inclined upper ply positioned to receive a piece cut from said cloth, means for driving said conveyor as an incident to cutting movement of said knife, a second endless conveyor having an upper ply positioned to receive a piece of cloth from said first conveyor, said second conveyor being mounted for reciprocal translational movement in said frame, a pair of rollers supporting said second conveyor and movable translationally therewith, a rack fixedly mounted on said frame, a gear meshing with said rack, and a one-way clutch between said gear and one of the rollers on which said second conveyor is mounted.

9. In a machine for cutting pieces of cloth from a continuous strip, a frame, a knife mounted for reciprocal translational movement in said frame in a direction corresponding to the longitudinal extent of said strip, said knife having a shape corresponding to that of the pieces to be cut, a pressure roller movably mounted in said frame opposite to said knife with the strip of cloth passing between said knife and said roller, an endless conveyor including a downwardly inclined upper ply positioned to receive a piece cut from said cloth, means for driving said conveyor as an incident to cutting movement of said knife, a second endless conveyor having an upper ply positioned to receive a piece of cloth from said first conveyor, said second conveyor being mounted for reciprocal translational movement in said frame, a pair of rollers supporting said second conveyor and movable translationally therewith, mechanism for causing travel of said second conveyor over said rollers upon translational movement of said conveyor and rollers in one direction only, and a vertically movable table positioned to have a cut piece delivered thereto by said second conveyor.

10. In a machine for cutting pieces of cloth from a continuous strip, a frame, a knife mounted for reciprocal translational movement in said frame in a direction corresponding to the longitudinal extent of said strip, said knife having a shape corresponding to that of the pieces to be cut, a pressure roller movably mounted in said frame opposite to said knife with the strip of cloth passing between said knife and said roller, an endless conveyor including a downwardly inclined upper ply positioned to receive a piece cut from said cloth, means for driving said conveyor as an incident to cutting movement of said knife, a second endless conveyor having an upper ply positioned to receive a piece of cloth from said first conveyor, said second conveyor being mounted for reciprocal translational movement in said frame, a pair of rollers supporting said second conveyor and movable translationally therewith, mechanism for causing travel of said second conveyor over said rollers upon translational movement of said conveyor and rollers in one direction only, a vertically movable table positioned to have a cut piece delivered thereto by said second conveyor, and mechanism for indexing said table downwardly a distance corresponding to the thickness of a piece upon each delivery of a piece thereto.

11. In a cutting machine of the character described and including a frame, mechanism for receiving a cut piece and delivering it to a desired location, said mechanism comprising a first endless conveyor mounted in said frame and having a top ply adapted to initially receive a cut piece, a platform mounted for horizontal reciprocation in said frame, a pair of spaced rollers on said platform, a second endless conveyor mounted on said rollers and having a top ply positioned to receive a piece from said first conveyor, means for moving said platform to move said second conveyor translationally, and rack and gear means operatively associated with one of said rollers in said frame, for causing travel of said second conveyor over said rollers upon translational movement of said platform in one direction only.

12. In a cutting machine of the character described and including a frame, mechanism for receiving a cut piece and delivering it to a desired location, said mechanism comprising an endless conveyor consisting of a plurality of spaced apart endless belts which together provide an inclined upper ply which initially receives a cut piece, a platform mounted for reciprocal translational movement in said frame, a second conveyor comprising a plurality of spaced endless belts interposed between the belts of said first conveyor, and which belts together define a composite upper ply adapted to receive a piece from said first conveyor, spaced rollers on said platform mounting the belts of said second conveyor, a rack on said frame, a gear meshing with said rack, and a one-way clutch between said gear and one of said rollers whereby movement of said platform in one direction causes travel of said second conveyor over said rollers with movement of the platform in the opposite direction causing no such travel.

JEROME S. IDELMAN.

REFERENCES CITED

The following references are of record in the file of this patent:

UNITED STATES PATENTS

| Number | Name | Date |
|---|---|---|
| 73,243 | Goodyear | Jan. 14, 1868 |
| 585,998 | Adams | July 6, 1897 |
| 1,223,942 | Diehl | Apr. 24, 1917 |
| 1,545,915 | Maxson | July 14, 1925 |
| 1,548,107 | Street | Aug. 4, 1925 |
| 1,709,005 | Broadmeyer | Apr. 16, 1929 |
| 1,834,299 | Williams | Dec. 1, 1931 |
| 1,876,838 | Biggert | Sept. 13, 1932 |
| 1,938,725 | Seybold | Dec. 12, 1933 |
| 1,960,667 | Hutt et al. | May 29, 1934 |
| 2,005,325 | Peterson | June 18, 1935 |
| 2,261,967 | Matthews | Nov. 11, 1941 |
| 2,332,863 | Luehrs | Oct. 26, 1943 |
| 2,405,868 | Whittaker et al. | Aug. 13, 1946 |